United States Patent [19]

Altenbokum et al.

[11] 4,106,366
[45] Aug. 15, 1978

[54] PLANETARY GEAR

[75] Inventors: Karlheinz Altenbokum; Rolf Goldschmidt; Klaus Hansgen, all of Witten; Heinz M. Hiersig, Dusseldorf; Peter Szynka, Witten, all of Fed. Rep. of Germany

[73] Assignee: Mannesmann Aktiengesellschaft, Dusseldorf, Fed. Rep. of Germany

[21] Appl. No.: 745,431

[22] Filed: Nov. 26, 1976

[30] Foreign Application Priority Data

Dec. 9, 1975 [DE] Fed. Rep. of Germany ....... 2558093

[51] Int. Cl.² .................... F16H 1/28; F16H 57/00
[52] U.S. Cl. ........................... 74/801; 74/410
[58] Field of Search ............................ 74/410, 801

[56] References Cited
U.S. PATENT DOCUMENTS

| 1,027,236 | 5/1912 | Cake ................... 74/410 X |
| 1,244,223 | 10/1917 | McInish ................ 74/410 X |
| 3,943,780 | 3/1976 | Klaue .................. 74/410 X |
| 3,974,718 | 8/1976 | Kylberg ................ 74/410 X |

*Primary Examiner*—Leonard H. Gerin
*Attorney, Agent, or Firm*—Ralf H. Siegemund

[57] ABSTRACT

A play-free planetary drive includes a sun gear and an internal gear between which planetary gears revolve as they rotate. The planetary gears are slightly beveled. The sun gear and the internal gear also are beveled, so that the bevel of the sun gear and of the internal gear match that of the planetary gears. With this arrangement of the gears, the sun gear and the internal gear are urged axially against the planetary gears, meshing into them until play has been eliminated. The internal gear is non-rotatably mounted to the housing, but is permitted to shift slightly radially to accommodate radial run-out of the planetary gears. Likewise, the sun gear is permitted to shift slightly radially to accommodate radial run-out of the planetary gears. The radial accommodation thus provided achieves a degree of load equalization among the planetary gears.

5 Claims, 2 Drawing Figures

PLANETARY GEAR

BACKGROUND OF THE INVENTION

This invention relates to a planetary gear consisting of a sun gear, a non-rotating internal spur gear or hollow gear and at least two planet gears meshing with the teeth of the sun gear and the spur gear, the planet gears being connected by a planet link.

Because of their compact construction and large reduction gear ratios, planetary gears are frequently used for the drives of automotive vehicles and other mobile power plants. Planetary gears may also be used for robust stationary drives, for example, for driving rolling mills and the like.

The play normally present in planetary gears is generally of no account. This is because the high quality of modern gear cutting machines permits this distance to be maintained within narrow limits.

The freedom of play of a drive, however, is of particular importance for adjustment drives having a changing direction of rotation when, for example, the turnstile of a directional antenna or of a telescope is driven. In this case even a small deviation from a predetermined position of a drive can cause considerable impairment of the performance. Therefore, planetary drives of the prior art were not favored for use in exact adjustment drives.

SUMMARY OF THE INVENTION

In accordance with the present invention, the sun gear, the internal gear and the planetary gears are beveled, so that the bevel of the sun gear and of the internal gear match that of the planetary gear. Thus, the gearing of these gears changes axially, so that the positive change of the sun gear as well as of the internal gear are effective at the drive side of the respective teech, which the positive shift in profile of the planet gears are effective at the at the driven side thereof.

By this arrangement of the teeth, the gears can be urged together axially, meshing into each other until they are practically free of play.

To compensate for axial manufacturing tolerances a further development of the invention provides that the sun gear and the internal gear individually be slightly movable radially with respect to the planet gears. In this manner, freedom from play can be achieved simultaneously with equalization of the load since the individually radially movable gears accommodate run-out or eccentricity errors in the planetary gear assembly.

In a preferred embodiment, play is automatically eliminated by use of a spring to urge the beveled gears axially into play-free engagement. The axial force could alternatively be generated and adjusted by alternative associated means such as mechanical, hydraulic, pneumatic or electric adjustment devices. Overload can be avoided by use of an adjustable limit on the axial stroke of the adjustment device.

It is therefore an object of the invention to provide a planetary drive which is free of play so that it can be utilized, for example, as a precisely operating adjustment drive with alternating direction of rotation.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENT

Figure 1:
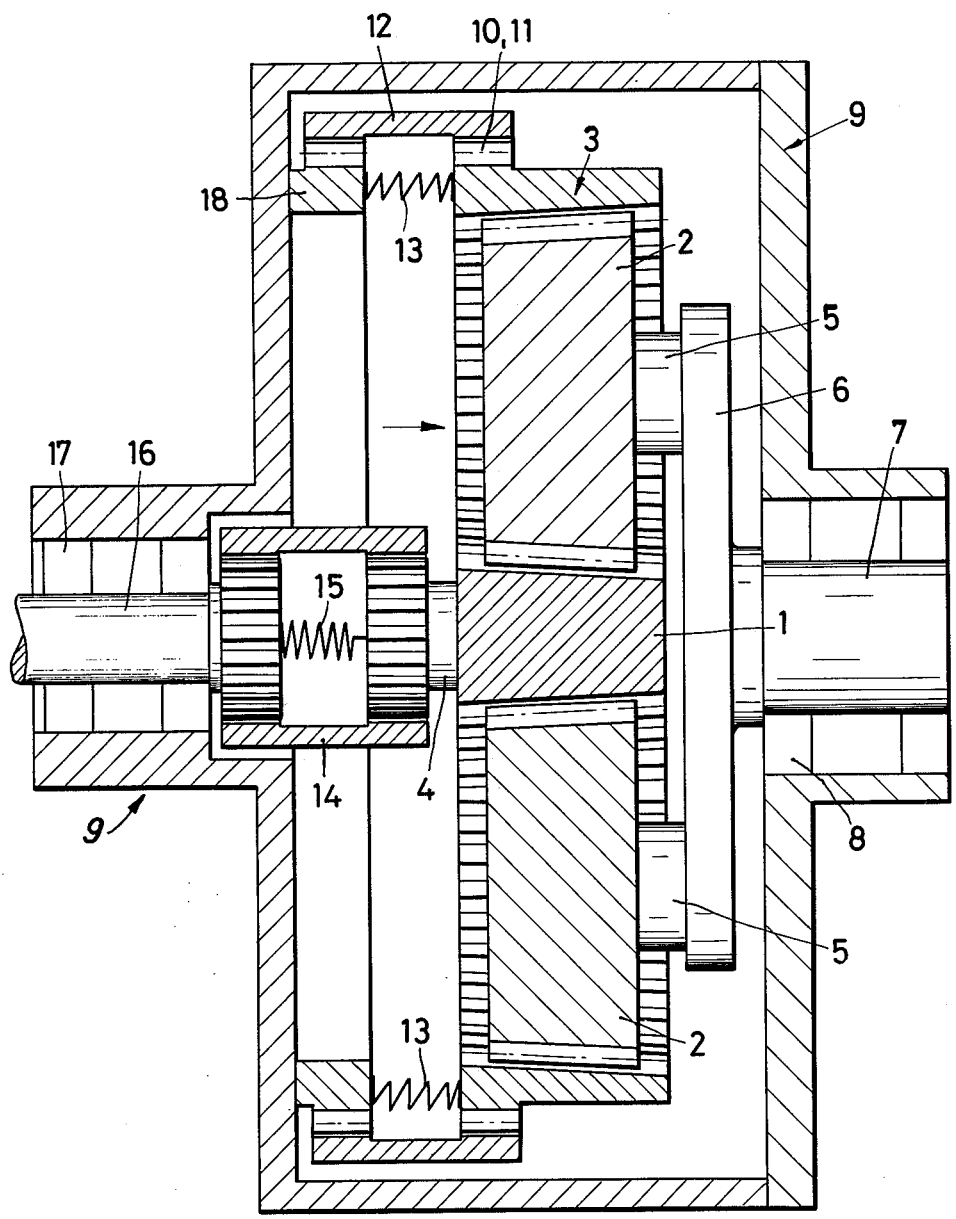
FIG. 1 is a cross-sectional view of a planetary gear in accordance with the invention taken on line 1 — 1 of FIG. 2.
Figure 2:
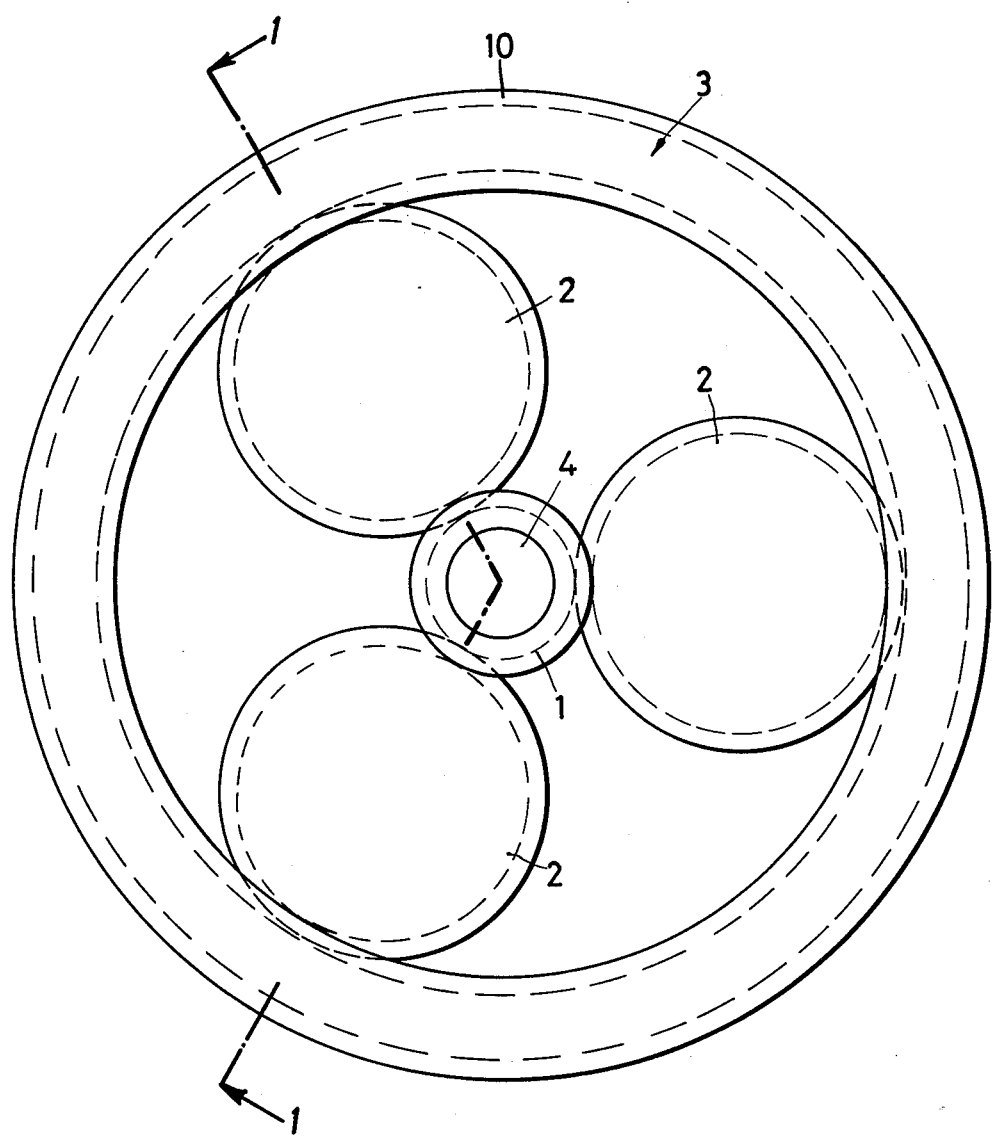
FIG. 2 is a side elevational view of a portion of the gear of FIG. 1.

Referring now to the drawings, there is illustrated a planetary gear consisting of a sun gear 1, three planet gears 2 which mesh with the teeth of the sun gear 1 and a hollow or internal spur gear 3. The planet gears 2 are connected by a planet link 6 and the planet shafts 5 are associated with the planet gears 2. The sun gear 1 is journalled to the pin 4, which is provided with outer teeth and is positioned in a coupling housing 14 provided with a double row of internal teeth. Due to this type of journalling, the sun gear is slightly movable radially within narrow limits by which means some degree of load equalization is obtained.

The sun gear is driven by the coupling housing 14 from a drive shaft 16 which engages the coupling housing 14 by teeth and which is mounted in a drive housing 9 by means of a journal 17. A compression spring 15 is positioned to bear between the pin 4 of the sun gear 1 and stationary drive shaft 16.

The spur gear teeth of the sun gear 1, the internal gear 3 and the planet gears 2 are slightly bevelled as illustrated in FIG. 1 on an exaggerated scale for the purpose of illustration. This bevelling is carried out in such a manner that the bevel of the sun gear 1 and the bevel of the internal gear 3 match the bevel of the planet gear 2. Accordingly, there is a gradual or steady change in gearing profile in that the positive shift of the profile of gears 1 and 3 are at the drive side of the teeth while the analogous positive change of the planet gears is on the drive side thereof.

The output shaft 7 is mounted in a journal 8 in the drive housing 9 and therefore is axially immovable. The planet link 6 is affixed to the output shaft 7. Therefore the planet gears 2 also have an axially immovable position. The sun gear 1, as well as the internal gear 3 are axially displaceable while the spring 15 insures a play-free meshing of the sun gear 1 with the planet gears 2.

The springs 13 are provided to maintain the internal gear 3 in a play-free engagement. The spring 13 bears against an annular extension 18 of the drive housing 9. The annular extension 18 is provided with external teeth which mesh with a sleeve 12 provided with internal teeth, the portion of the teeth meshing with the internal gear being designated 11. The outer teeth 10 of the spur gear 3 mesh with the inner teeth 11 of the sleeve 12, to allow axial displacement of the internal gear 3 with respect to the sleeve 12. The internal gear 3 is supportively mounted to the fixed drive housing 9 by the sleeve 12.

The invention is not limited to the embodiments described above but all changes and modifications thereof not constituting departures from the spirit and slope of the invention are intended to be included.

We claim:

1. A planetary drive comprising:
   a sun gear;
   an internal gear;

at least two planet gears having teeth and being in engagement with said sun gear and said internal gear, said sun gear and said internal gears are axially movable with respect to the planet gears;

a planet link connecting said planet gears; at least one of said sun gear, said planet link, and said internal gear being radially movable for equalizing the load; said sun gear, said internal gear and said planet gears having beveled spur gear teeth, with the bevel of said sun gear and of said internal gears matching the bevel of said planet gears; and means for axially urging said sun gear and internal gear into engagement with said planet gears.

2. The planetary drive of claim 1 said means being resilient means for urging said sun gear and said internal gear into axial engagement with said planet gears.

3. The planetary drive of claim 2 wherein said resilient means further comprises a spring.

4. The planetary drive of claim 1 wherein both said sun gear and said internal gear are radially movable.

5. The planetary drive of claim 1, said means for urging providing an adjustable force.

* * * * *